(12) United States Patent
Kwon

(10) Patent No.: US 12,197,206 B2
(45) Date of Patent: Jan. 14, 2025

(54) UAV DELIVERY AND UAV OPERATION SYSTEM

(71) Applicant: NARMA CO. LTD., Daejeon (KR)

(72) Inventor: Kijung Kwon, Daejeon (KR)

(73) Assignee: NARMA CO. LTD., Daejeon (KR)

( * ) Notice: Subject to any disclaimer, the term of this patent is extended or adjusted under 35 U.S.C. 154(b) by 286 days.

(21) Appl. No.: 17/955,652

(22) Filed: Sep. 29, 2022

(65) Prior Publication Data
US 2024/0111282 A1    Apr. 4, 2024

(51) Int. Cl.
| | |
|---|---|
| *G05D 1/00* | (2024.01) |
| *B60L 53/62* | (2019.01) |
| *B64U 80/25* | (2023.01) |
| *B64U 80/86* | (2023.01) |
| *G01C 21/00* | (2006.01) |
| *G06F 3/0488* | (2022.01) |
| *B64U 101/15* | (2023.01) |
| *B64U 101/20* | (2023.01) |
| *B64U 101/60* | (2023.01) |

(52) U.S. Cl.
CPC ............ *G05D 1/0016* (2013.01); *B60L 53/62* (2019.02); *B64U 80/25* (2023.01); *B64U 80/86* (2023.01); *G01C 21/3885* (2020.08); *G05D 1/101* (2013.01); *G06F 3/0488* (2013.01); *B60L 2200/10* (2013.01); *B64U 2101/15* (2023.01); *B64U 2101/20* (2023.01); *B64U 2101/60* (2023.01); *B64U 2201/20* (2023.01)

(58) Field of Classification Search
CPC .. G05D 1/0016; G05D 1/101; G01C 21/3885; B64C 39/024; G06F 3/0488; B64U 2201/20; B64U 2201/60; B64U 2201/15; B60L 2200/10

USPC ............................................................ 701/2
See application file for complete search history.

(56) References Cited

U.S. PATENT DOCUMENTS

| | | | |
|---|---|---|---|
| 7,386,392 B1* | 6/2008 | Kabel .................... | G01C 21/20 701/425 |
| 11,935,420 B1* | 3/2024 | Suiter .................. | G08G 5/0091 |
| 2004/0249569 A1* | 12/2004 | Oh .......................... | G01C 21/34 340/995.19 |
| 2013/0079962 A1* | 3/2013 | Ishikawa .............. | B60L 15/2045 701/22 |
| 2016/0044129 A1* | 2/2016 | Bergmann .......... | H04L 67/5681 455/406 |
| 2016/0240189 A1* | 8/2016 | Lee ......................... | G10L 15/22 |
| 2017/0240174 A1* | 8/2017 | Sawada ................. | B60W 20/00 |
| 2018/0033314 A1* | 2/2018 | Boss .................... | G08G 5/0069 |
| 2018/0058879 A1* | 3/2018 | Tayama ............. | B60W 60/0011 |

(Continued)

FOREIGN PATENT DOCUMENTS

KR    10-2335592 B1    12/2021

*Primary Examiner* — Richard A Goldman
(74) *Attorney, Agent, or Firm* — Harness, Dickey & Pierce, P.L.C.

(57) ABSTRACT

The present disclosure relates to a UAV delivery and operation station that includes: a drone control device; a station providing a drone standby and landing place; and a drone operated in accordance with instructions from the drone control device, wherein the drone control device includes: a flight route storage storing designated flight routes (GPS information) stored in advance for delivery destinations, respectively; and a first transceiver transmitting the designated flight routes (GPS information) to the drone using LTE or RF.

8 Claims, 7 Drawing Sheets

(56) References Cited

U.S. PATENT DOCUMENTS

| | | | |
|---|---|---|---|
| 2019/0023239 A1* | 1/2019 | Fujita | G01S 13/867 |
| 2019/0031198 A1* | 1/2019 | Aoki | G06V 20/58 |
| 2019/0066047 A1* | 2/2019 | O'Brien | G06Q 10/0838 |
| 2019/0197254 A1* | 6/2019 | Salgar | G06F 21/6245 |
| 2019/0360823 A1* | 11/2019 | Nelson | G01C 21/3415 |
| 2020/0158521 A1* | 5/2020 | Iijima | B60W 60/0013 |
| 2020/0301413 A1* | 9/2020 | Wengreen | B60W 60/00186 |
| 2020/0331492 A1* | 10/2020 | Itoh | B60W 50/06 |
| 2020/0413481 A1* | 12/2020 | Shemer | G06F 9/4856 |
| 2021/0195823 A1* | 7/2021 | Yuasa | G05D 1/0278 |
| 2021/0276581 A1* | 9/2021 | Sekine | B60W 60/0061 |
| 2021/0316733 A1* | 10/2021 | Mizoguchi | B60W 40/02 |
| 2021/0362848 A1* | 11/2021 | Spencer | B64C 29/0033 |
| 2022/0001975 A1* | 1/2022 | Cracknell | A45F 3/04 |
| 2023/0078653 A1* | 3/2023 | Yang | G01C 21/3484 |
| | | | 701/533 |
| 2023/0406143 A1* | 12/2023 | Dow | G06Q 10/0631 |
| 2024/0111282 A1* | 4/2024 | Kwon | G01C 21/3885 |

* cited by examiner (a): drone control device (b) ground control system

KIOSK
(Ground Contol System)

[destination selection image-example 1]

[destination selection image-example 2]

[drone start image]

UAV DELIVERY AND UAV OPERATION SYSTEM

FIELD

The present disclosure relates to a UAV delivery and operation station for munitions that can replace an existing manual controller or a computer-based ground control system and can conveniently operate a drone by operating a drone using a kiosk having a touch screen.

BACKGROUND

The drone station (Narma Inc.) that includes: a roof on which a drone is landed; a side wall erected around the roof from the bottom of the roof; a nozzle formed at the edge where the roof and the side wall intersect each other and spraying airflow upward; a grill formed at the side wall 12 so that external air flows inside; a panel disposed inside the grill and guiding fluid flow such that fluid flows from the grill to the nozzle; and a rotor disposed inside the guide panel and moving fluid from the grill to the nozzle by rotating, and further includes a stabilizer disposed inside the side wall to control the flow rate, flow speed, and spray direction of fluid moving to the nozzle has been disclosed in Korean Patent No. 10-2335592.

So far, a method of piloting a drone uses a manual controller (for an external pilot) and a computer-based ground control system (for an inner pilot). FIG. 1a shows a manual controller and FIG. 1B shows a ground control system.

Since the manual controller requires high operation skills, a drone pilot has a large burden of workloads. Further, since the ground control system is complicated to use and has a high accident possibility due to wrong setting, so an operator also has a large burden.

SUMMARY

When lithium polymer batteries that are most generally used for drones are stored for a long time (1 week) in a 100% fully charged state, the performance is quickly deteriorated, so they are discarded in many cases. In order to prevent this problem, lithium polymer batteries should be stored in a storage mode of 5080% charging. However, it is required to always keep a drone in an on-mode in order to keep a golden time for drones that carry emergency articles for emergency patients, and to this end, there is a need for a station that always keeps a drone battery in 70%.

An objective of the present disclosure is to provide a UAV delivery and operation station that can replace an existing manual controller or a computer-based ground control system and can conveniently operate a drone by operating a drone using a kiosk having a touch screen.

An objective of the present disclosure is to provide a UAV delivery and operation station that makes it easy to operate a drone that flies through a designated route of a standby state and makes a safe takeoff and charging management of a drone.

An objective of the present disclosure is to provide a UAV delivery and operation station (a drone operation system having a kiosk and a station for controlling a drone) that is suitable for delivering emergency articles, such as an AED, and a military emergency articles (ammunition, shells, medical articles for soldiers, food, medicine) for a war.

A UAV delivery and operation station (a drone operation system having a kiosk and a station for controlling a drone) of the present disclosure includes: a drone control device; a station (200) providing a drone standby and landing place; and a drone (300) operated in accordance with instructions from the drone control device, wherein the drone control device includes: a flight route storage (110) storing designated flight routes (GPS information) stored in advance for delivery destinations, respectively; and a first transceiver (140) transmitting the designated flight routes (GPS information) to the drone (300) using LTE or RF.

In the drone operation system having a kiosk and a station for controlling a drone of the present disclosure, the drone control device is a kiosk (100) having a touch screen (120 through which touch-type input is possible, and includes: a control unit (130) connected with the flight route storage (110), the touch screen (120), and the first transceiver (140); and a second transceiver (150) communicating with the station (200).

In the drone operation system having a kiosk and a station for controlling a drone of the present disclosure, the touch screen (120) of the kiosk (100) includes: a start button positioned in a start image; a destination selection button (122) positioned in a main image to send the drone; and a flight button (123) starting to fly the drone by clicking a flight button positioned in a drone start image.

In the drone operation system having a kiosk and a station for controlling a drone of the present disclosure, the drone control kiosk is configured such that when it is required to change a drone destination in the drone start image, it is possible to select again a destination in a destination image by clicking a back button.

The station (200) includes: a third transceiver (250) communicating with the transceiver (150) using Bluetooth; a human sensor (240) sensing human around the station; and a charging manager (230) managing the charging state of the drone (300), and when a flight start instruction is transmitted from the kiosk (100) and then a human sensing signal is generated from the human sensor (240), the third transceiver (250) transmits a takeoff delay signal due to human sensing to the control unit (120) of the kiosk (100).

The charging manager (230) of the station (200) of the present disclosure maintains the charging state of the drone (300) at at least 50~80%, the charging manager (230) of the station (200) supplies power to a charging terminal of the drone through a magnet type power supplier (231) connected to a magnet, and when a flight start instruction is given from the kiosk (100) or the drone takes off, the magnet connection portion is automatically disconnected.

The drone (300) stands by at the station (200) in a ready-to-fly state in which power is maintained to be able to be supplied anytime, when the charging state of the drone (300) is less than 50% after a flight start instruction is given from the kiosk (100), the third transceiver (250) transmits a charging state shortage alarm warning to the control unit (120) of the kiosk (100), and the drone is an emergency article delivery drone that delivers an AED, an emergency rescue articles, and medicine.

The kiosk (100) of the present disclosure further includes a flight route relay image (not shown), the drone (300) transmits location information in a flight route in real time to the control unit (130) of the kiosk (100) through the first transceiver (130) before landing at the station (200) after starting to fly, and the control unit (120) of the kiosk (100) shows in real time the location and the charging state of the drone through the flight route relay image (not shown).

According to the present disclosure, there is provided a UAV delivery and operation station (a drone operation system having a kiosk and a station for controlling a drone)

that can replace an existing manual controller or computer-based ground control system and can conveniently operate by operating a drone through a kiosk having a touch screen.

According to the present disclosure, there is provided a UAV delivery and operation station that makes it easy to operate a drone that flies through a designated route of a standby state and makes a safe takeoff and charging management of a drone.

According to the present disclosure, there is provided a UAV delivery and operation station that is suitable for an emergency article delivery drone that delivers emergency articles such as an AED, an emergency rescue articles, and medicine, or a delivery drone for munitions that delivers military emergency articles (ammunition, shells, emergency medical articles, food) for a war.

DETAILED DESCRIPTION

Figure 1A:
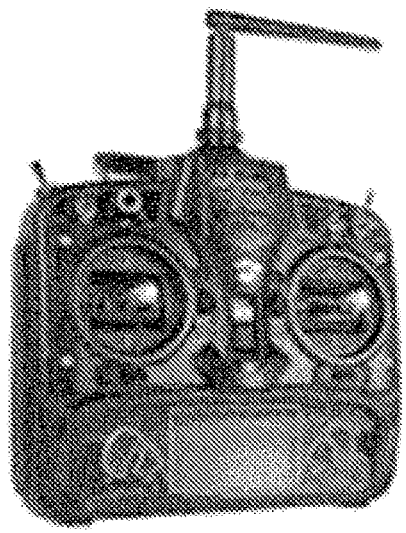
FIG. 1A shows a manual controller according to the related art and FIG. 1B is a configuration view of a ground control system.
Figure 1B:
Figure 2A:
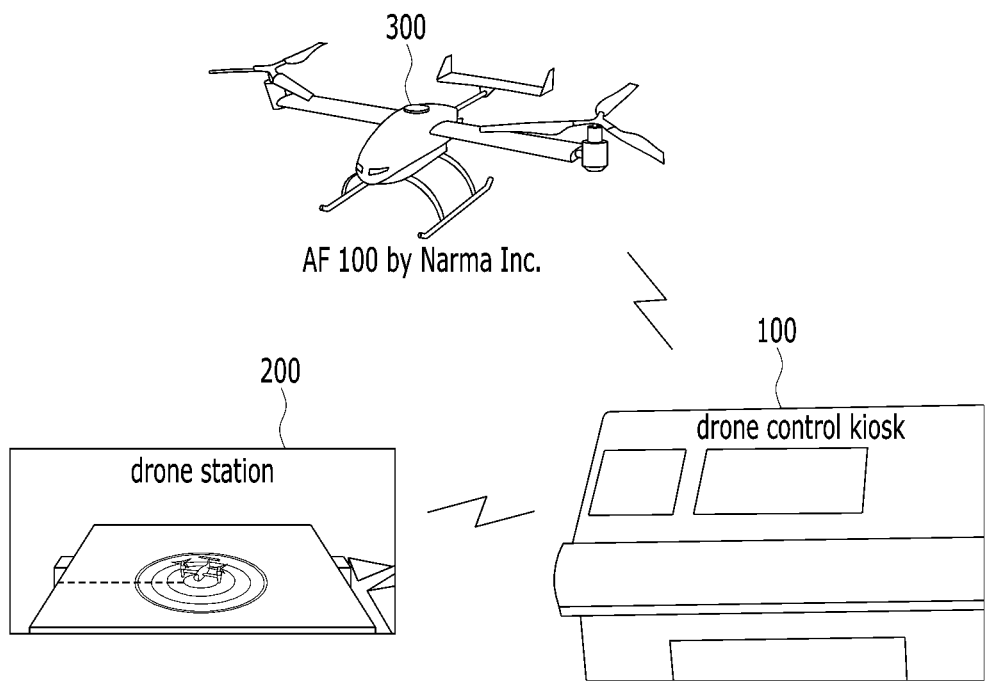
FIGS. 2A, 2B, and 2C are configuration views of an entire UAV delivery and operation station (a drone operation system having a kiosk and a station for controlling a drone), a kiosk, and a station of the present disclosure.
Figure 2B:
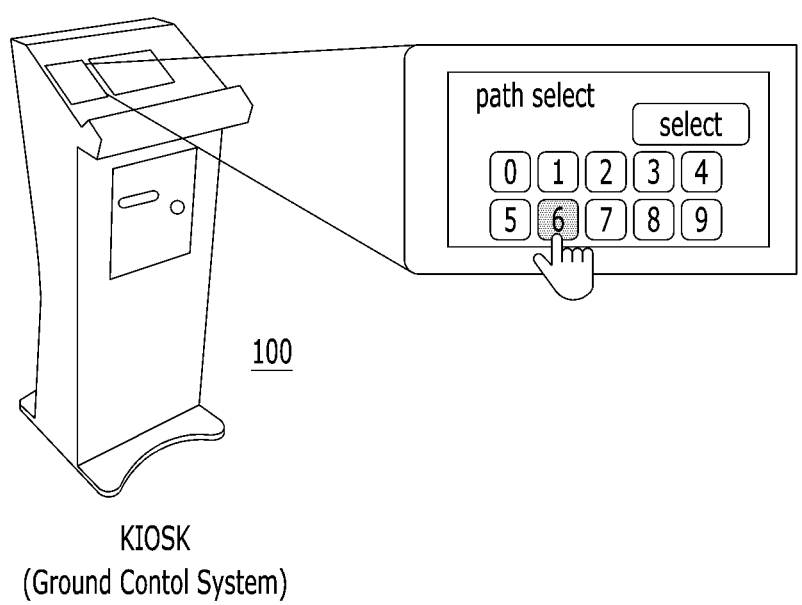
Figure 2C:
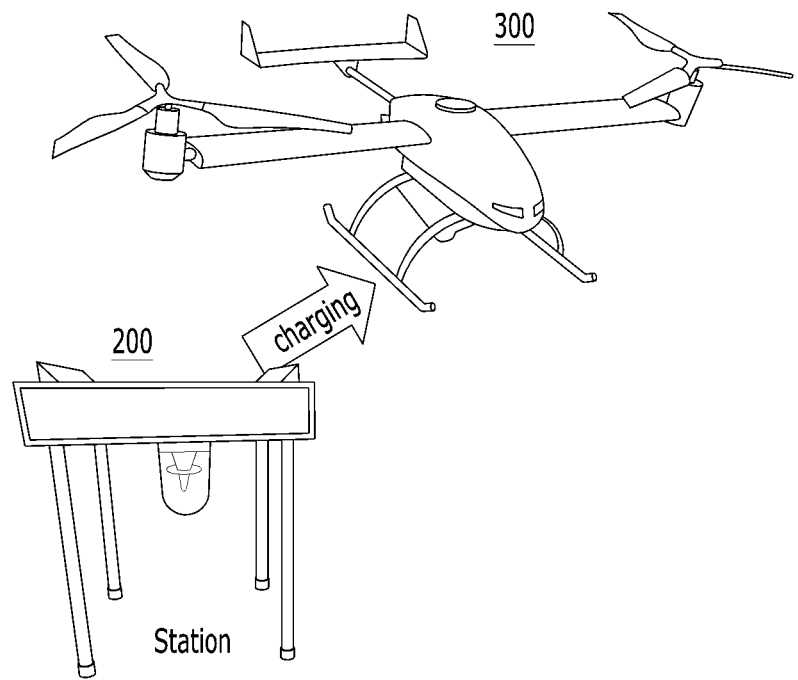
Figure 4:
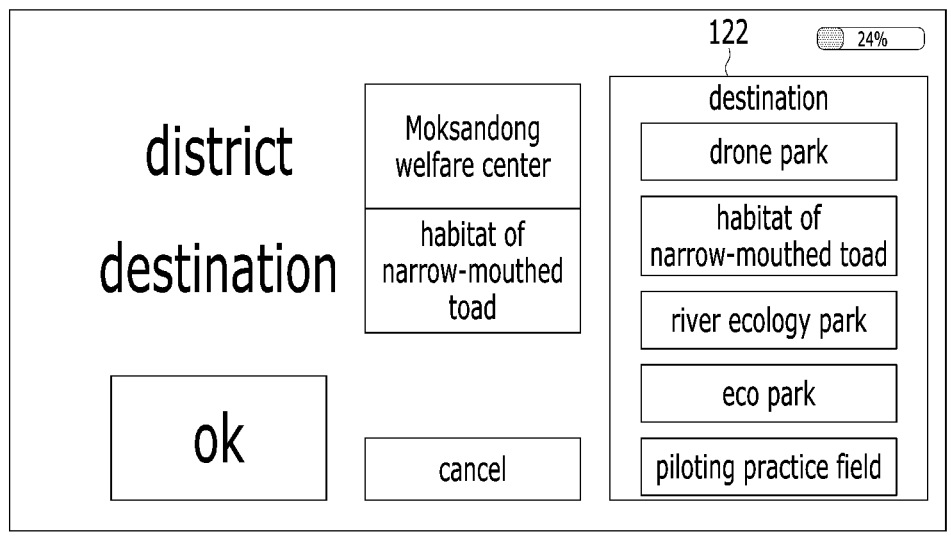
FIG. 4 is a configuration view of a menu of a kiosk for controlling a drone (destination selection)
Figure 4:
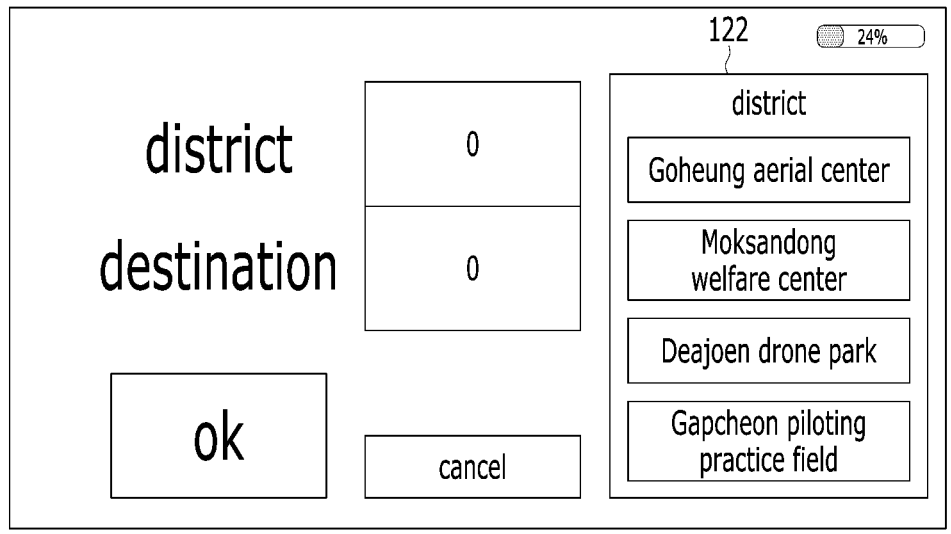
Figure 5:
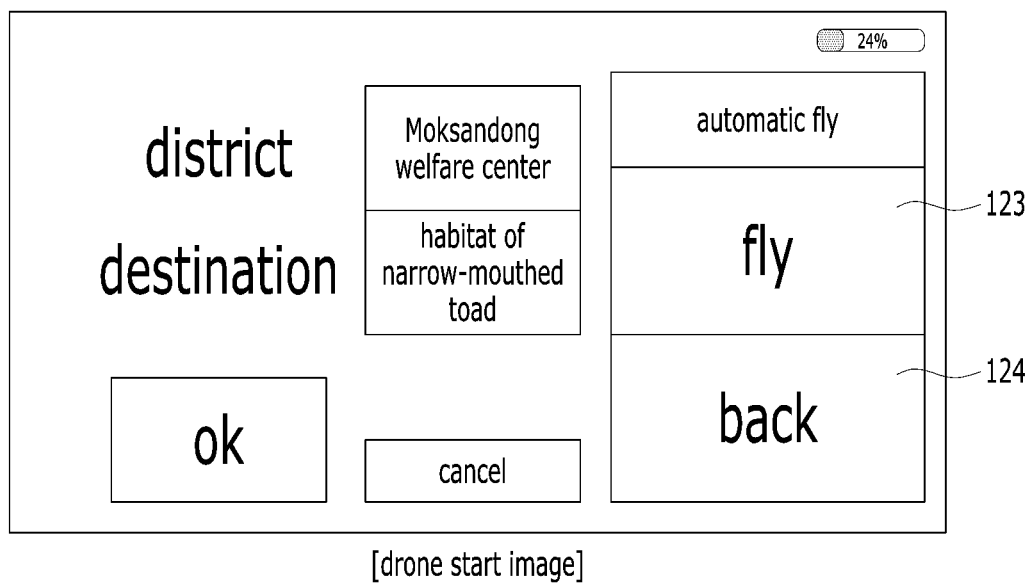
FIG. 5 is a configuration view of a menu of a kiosk for controlling a drone (flight start and destination reselection)
Figure 6:
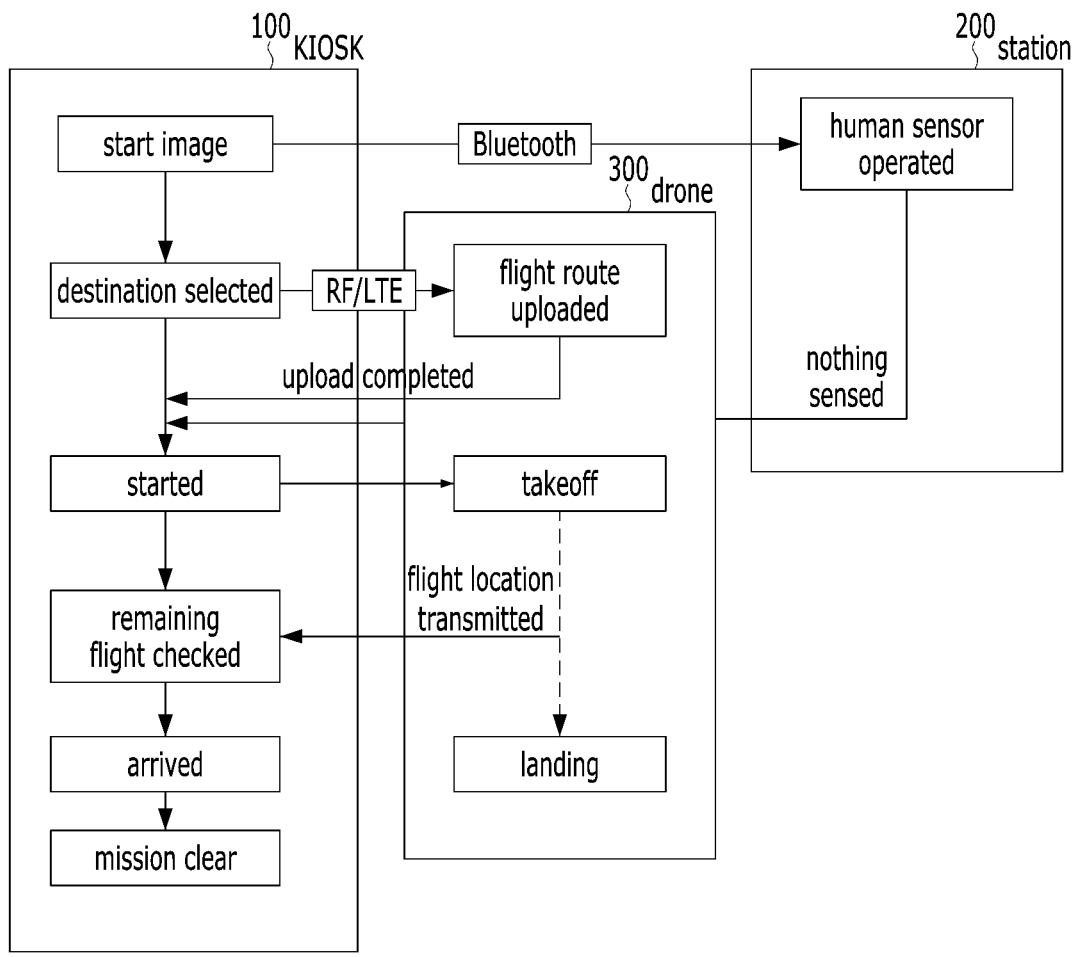
FIG. 6 is a configuration view showing controlling a drone through a drone control kiosk.
Figure 7:
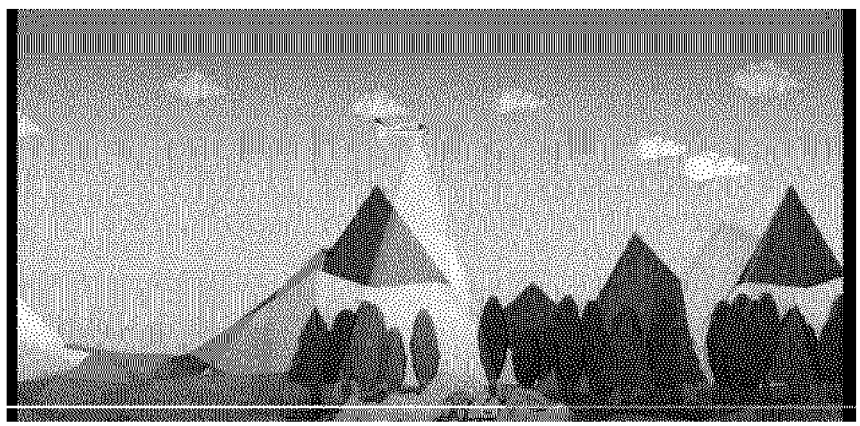
FIG. 7 is a view showing the concept of a designated route delivery of a drone.

Hereafter, a UAV delivery and operation station (a drone operation system having a kiosk and a station for controlling a drone) according to an embodiment of the present disclosure is described. FIGS. 2A, 2B, and 2C are configuration views of an entire drone delivery system having a kiosk and a station for controlling a drone, a kiosk, and a station of the present disclosure, FIG. 3 is a detailed configuration view of the drone operation system having a kiosk and a station for controlling a drone, FIG. 4 is a configuration view of a menu of a kiosk for controlling a drone (destination selection), FIG. 5 is a configuration view of a menu of a kiosk for controlling a drone (flight start and destination reselection), FIG. 6 is a configuration view showing controlling a drone through a drone control kiosk, and FIG. 7 is a view showing the concept of a designated route delivery of a drone.

Figure 3:
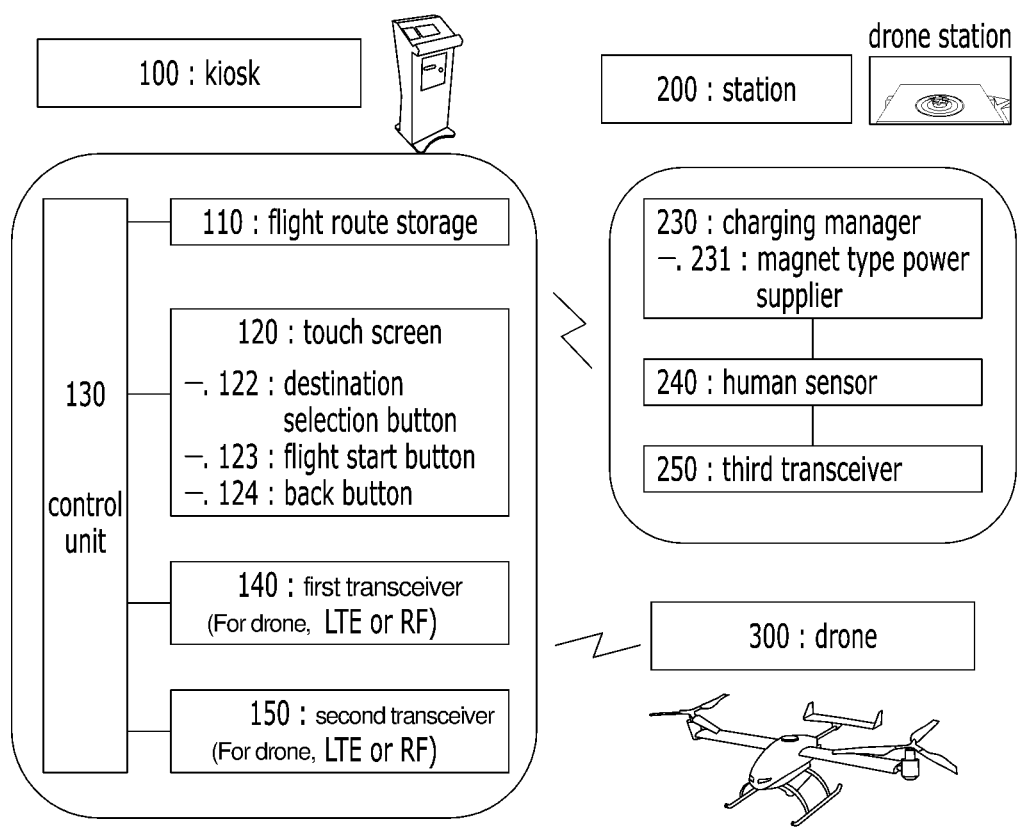
FIG. 3 is a detailed configuration view of a UAV delivery and operation station (a drone operation system having a kiosk and a station for controlling a drone) of the present disclosure.

As shown in FIGS. 2 and 3, a drone operation system having a kiosk and a station for controlling a drone includes a drone control device, a station 200 providing drone standby and takeoff place, and a drone 300 that is moved in accordance with instructions from the drone control device.

As shown in FIGS. 2 and 3, the drone control device includes a flight route storage 110 storing designated flight routes (GPS information) stored in advance for destinations, respectively, and a first transceiver 140 transmitting the designated flight routes (GPS information) to the drone 300 using LTE or RF.

<Designated Route—Touch Screen>

As shown in FIGS. 2 and 3, in an embodiment of the present disclosure, the drone control device is a kiosk 100 having a touch screen 120 through which touch-type input is possible, and further includes a control unit 120 connected with the flight route storage 110, the touch screen 120, and the first transceiver 140, and a second transceiver 150 communicating with the station 200.

As shown in FIGS. 4 and 5, in an embodiment of the present disclosure, the touch screen 120 of the kiosk 100 includes a start button positioned in a start image, a destination selection buttons 122 positioned in a main image to send the drone, and a flight button 123 starting to fly the drone by clicking a flight button positioned in a drone start image.

As shown in FIG. 5, when it is required to change a drone destination in the drone start image, it is possible to select again a destination in a destination image by clicking a back button 124.

In an embodiment of the present disclosure, the control unit 130 of the drone control device uploads a flight route of a destination input through the touch screen 120 from the flight route storage 110 and transmits the flight route to the drone 300 through the first receiver 140. In an embodiment of the present disclosure, the drone 300 may be a delivery drone.

<Sensing of Human>

As shown in FIG. 3, in an embodiment of the present disclosure, the station 200 includes a third transceiver 250 communicating with the transceiver 150 for the station using Bluetooth, a human sensor 240 sensing human around the station, and a charging manager 230 managing the charging state of the drone 300.

In an embodiment of the present disclosure, the human sensor 240 may be a thermal sensor or an image sensing unit that recognizes human by analyzing an image. When a flight start instruction is given from the kiosk 100 and then a human sensing signal is generated from the human sensor 240, the third transceiver 250 transmits a flight delay signal due to human sensing to the control unit 120 of the kiosk 100. As shown in FIG. 2, the station 200 may have a warning light at the lower portion of a supporting base to turn on the warning light when a sensing signal is generated from the human sensor 240 after a flight start instruction is given from the kiosk 100. The station includes a second control unit and the second control unit can generally control the charging manager 230, the human sensor 240, the third transceiver 250 that is a communication unit, and taking off/landing of the drone.

<Management of Charging>

As shown in FIG. 3, in the drone operation system having a kiosk and a station for controlling a drone, the charging manager 230 of the station 200 maintains the charging state of the drone 300 at at least 50~80%. The charging manager 230 of the station 200 supplies power to a charging terminal of the drone through a magnet type wire-shape power supplier 231 connected to a magnet. When a flight start instruction is given from the kiosk 100 or the drone takes off, the magnet type wire of the power supplier 231 is automatically disconnected. When a permanent magnet is used for the magnet type connection wire, a permanent magnet connection portion is disconnected by an external force due to rising of the drone.

Alternatively, when an electromagnet type connector is used and the flight start button 123 is pressed through the touch screen 120, the controller 130 transmits a flight start signal to the charging manager 120 of the station 200 through the second transceiver 150 and the charging manager 230 cuts connection before flight is started through the electromagnet connection portion of the magnet type power supplier 231. When the charging state is less than 50%, the flight time decreases, and when the charging state is 80% or more and the drone is not used for a long time, there is a problem of reduction of the battery lifespan.

The drone 300 stands by at the station 200 in a ready-to-fly state in which power is maintained to be able to be supplied anytime, and when the charging state of the drone 300 is less than 50% after a flight start instruction is given from the kiosk 100, the third transceiver 250 transmits a charging state shortage alarm warning to the control unit 120 of the kiosk 100, thereby being able to delay a takeoff.

In an embodiment of the present disclosure, the drone may be an emergency article delivery drone that delivers emergency articles such as an AED, an emergency rescue articles, and medicine, or may be a delivery drone for munitions that delivers articles including military emergency articles (ammunition, shells, emergency medical articles, food) for a war. The drone 300 stands by at the station 200 in a ready-to-fly state in which the power is maintained to be able to be supplied anytime for an emergency delivery.

<Relay Image>

As shown in FIG. 3, the kiosk 100 may further includes a flight route relay image (not shown) in terms of assistance. The drone 300 transmits location information in a flight route in real time to the control unit 120 of the kiosk 100 through the first transceiver 130 before landing at the station 200 after starting to fly. The control unit 120 of the kiosk 100 can show in real time the location and the charging state of the drone through the flight route relay image (not shown).

The drone operation system having a kiosk and a station for controlling a drone according to an embodiment of the present disclosure is further described hereafter. The present disclosure relates to a kiosk and an all-time power-on (ready-to-fly) station that can conveniently operate a drone to designated places without a drone operator to specifically input route because optimal flight routes are stored in advance.

The drone 300 stands by at the ready-to-fly station at which power is maintained to be able to be supplied anytime, and keeps communication with the kiosk using LTE or RF, and the station and the kiosk keeps connected through Bluetooth.

The station 200 and the drone 300 are connected through a wire, but power is supplied through a wire connected to a magnet for a quick takeoff.

An example of the kiosk 100 is as follows. A start button is pressed in the first start image and a destination to which the drone 300 is sent is selected in the next main image. Thereafter, the drone is started to fly by clicking a flight button in the drone start image, or when it is required to change a drone destination, a destination is selected again in the destination image by clicking the back button.

The station 200 managing power of the drone 300 has a safety device that recognizes people through the human sensor 240 and prevents the drone 300 from taking off through the kiosk by sending the information to the kiosk 100 when there are people around through Bluetooth communication with the kiosk 100.

Although the present disclosure was described with reference to the preferable embodiments described above, the scope of the present disclosure is not limited thereto, is determined by the following claims, and may include various changes and modifications in the equivalent range of the present disclosure.

It should be noted that the reference numerals in the following claims are provided only to help understand the present disclosure without influencing construction of the right range and the right range should not be construed narrowly on the basis of the reference numerals.

What is claimed is:

1. An unmanned aerial vehicle (UAV) delivery and operation system comprising:
 a drone control device;
 a station; and
 a drone operated in accordance with instructions from the drone control device,
 wherein the drone control device includes:
 a flight route storage storing designated flight routes containing Global Positioning System (GPS) information stored for delivery destinations; and
 a first transceiver transmitting the designated flight routes containing GPS information to the drone using longer term evolution or 4G communications (LTE) or radio frequency (RF).

2. The UAV delivery and operation system of claim 1, wherein the drone control device is a kiosk having a touch screen, and includes:
 a control unit connected with the flight route storage, the touch screen, and the first transceiver; and
 a second transceiver communicating with the station.

3. The UAV delivery and operation system of claim 2, wherein the touch screen of the kiosk includes:
 a start button positioned in a start image;
 a destination selection button positioned in a main image to send the drone to a destination; and
 a flight button positioned in a start drone image to fly the drone.

4. The UAV delivery and operation system of claim 3, wherein when a change to a drone destination is required in the start drone image, different destination can be selected in a destination image by clicking a back button.

5. The UAV delivery and operation system of claim 2, wherein the station includes:
 a third transceiver communicating with the second transceiver using a wireless communication;
 a human sensor configured to sense human around the station; and
 a charging manager configured to manage a charging state of the drone, and
 when a flight start instruction is transmitted from the kiosk and then a human sensing signal is generated from the human sensor, the third transceiver transmits a takeoff delay signal in response to the human sensing signal to the control unit of the kiosk.

6. The UAV delivery and operation system of claim 2, wherein the charging manager of the station maintains the charging state of the drone at percentages of at least 50 to 80%,
 the charging manager of the station supplies power to a charging terminal of the drone through a power supplier having a magnet connection portion, and
 when a flight start instruction is given from the kiosk or the drone takes off, the magnet connection portion is automatically disconnected.

7. The UAV delivery and operation system of claim 6, wherein the drone stands by at the station in a ready-to-fly state in which power is maintained,
 when the charging state of the drone is less than 50% after a flight start instruction is given from the kiosk, the third transceiver transmits a charging state shortage alarm warning to the control unit of the kiosk, and the drone is an emergency article delivery drone that delivers emergency articles such as an automated external defibrillator (AED), an emergency rescue articles, and medicine, or is a delivery drone for munitions that delivers articles including military emergency articles for a war.

8. The UAV delivery and operation system of claim 2, wherein the kiosk further includes a flight route relay image,
the drone transmits location information of a flight route in real time to the control unit of the kiosk through the first transceiver before landing at the station after starting to fly, and
the control unit of the kiosk shows in real time the location and the charging state of the drone through the flight route relay image.

* * * * *